(12) United States Patent
Kohashi

(10) Patent No.: US 9,754,362 B2
(45) Date of Patent: Sep. 5, 2017

(54) IMAGE PROCESSING APPARATUS, IMAGE PROCESSING METHOD, AND PROGRAM

(71) Applicant: SONY CORPORATION, Tokyo (JP)

(72) Inventor: Takashi Kohashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/893,917

(22) PCT Filed: May 19, 2014

(86) PCT No.: PCT/JP2014/063210
§ 371 (c)(1),
(2) Date: Nov. 24, 2015

(87) PCT Pub. No.: WO2014/192577
PCT Pub. Date: Dec. 4, 2014

(65) Prior Publication Data
US 2016/0110854 A1 Apr. 21, 2016

(30) Foreign Application Priority Data

May 31, 2013 (JP) .................................. 2013-115723

(51) Int. Cl.
*G06K 9/00* (2006.01)
*G06T 5/00* (2006.01)
*H04N 1/407* (2006.01)

(52) U.S. Cl.
CPC .......... *G06T 5/008* (2013.01); *G06K 9/00281* (2013.01); *G06T 5/007* (2013.01);
(Continued)

(58) Field of Classification Search
CPC ................ G06K 9/00281; G06T 5/008; G06T 2207/20012; G06T 2207/20016;
(Continued)

(56) References Cited

U.S. PATENT DOCUMENTS 6,870,955 B2* 3/2005 Lee ...................... H04N 1/6027
345/589
7,068,841 B2* 6/2006 Luo .......................... G06T 5/007
382/167

(Continued)

FOREIGN PATENT DOCUMENTS

JP 2004-221645 A 8/2004
JP 2007-234036 A 9/2007
(Continued)

*Primary Examiner* — Kanjibhai Patel
(74) *Attorney, Agent, or Firm* — Chip Law Group

(57) ABSTRACT

The present disclosure relates to an image processing apparatus, an image processing method, and a program which highlight a main object more outstandingly.

A tone curve adjustment unit performs tone curve adjustment on a target region of an input image signal (IN), and supplies an image signal subjected to the tone curve adjustment to a local level detection unit. The local level detection unit obtains a local level. A contrast adjustment unit performs adaptive contrast enhancement according to the local level from the local level detection unit. The present disclosure can be applied to an image processing apparatus which highlights a predetermined part of an image using the tone curve adjustment and the adaptive contrast adjustment, for example.

19 Claims, 24 Drawing Sheets

(52) U.S. Cl.
CPC ... *H04N 1/407* (2013.01); *G06T 2207/20012* (2013.01); *G06T 2207/20016* (2013.01); *G06T 2207/20021* (2013.01); *G06T 2207/20208* (2013.01)

(58) Field of Classification Search
CPC . G06T 2207/20021; G06T 2207/20208; G06T 5/50; H04N 1/407
USPC .................................................. 382/167, 274
See application file for complete search history.

(56) References Cited

U.S. PATENT DOCUMENTS

| | | | | |
|---|---|---|---|---|
| 7,742,637 B2* | 6/2010 | Xiao | ........................ | G06T 5/009 348/222.1 |
| 8,009,927 B2* | 8/2011 | Manabe | ............. | H04N 5/23219 348/229.1 |
| 8,355,595 B2* | 1/2013 | Bressan | .................. | G06T 5/009 382/266 |
| 8,483,508 B2* | 7/2013 | Yen | ......................... | G06T 5/009 358/1.9 |

FOREIGN PATENT DOCUMENTS

| | | |
|---|---|---|
| JP | 2009-206585 A | 9/2009 |
| JP | 2009-290661 A | 12/2009 |
| JP | 2010-233236 A | 10/2010 |
| JP | 2011-24247 A | 2/2011 |
| JP | 2011-259053 A | 12/2011 |
| JP | 2012-83848 A | 4/2012 |
| JP | 2002-262094 A | 9/2012 |

* cited by examiner

| | D-RANGE ADJUSTMENT UNIT | SIGNAL DISTRIBUTION ADJUSTMENT UNIT | ADAPTIVE CONTRAST ADJUSTMENT UNIT |
|---|---|---|---|
| CONFIGURATION 1 | YES | YES | YES |
| CONFIGURATION 2-1 | NO | YES | YES |
| CONFIGURATION 2-2 | NO | YES(*) | NO |

IMAGE PROCESSING APPARATUS, IMAGE PROCESSING METHOD, AND PROGRAM

TECHNICAL FIELD

The present disclosure relates to an image processing apparatus, an image processing method, and a program, and, in particular, relates to an image processing apparatus, an image processing method, and a program that are configured to highlight a main object more outstandingly in an image.

BACKGROUND ART

There is a method of obtaining a preferable image by adjusting brightness or color of a main object region in an image to highlight a main object more than the other part.

For example, Patent Literature 1 discloses a method of performing an enhancement processing by analyzing an image signal of a main object region and setting an enhancement characteristic suitable for the main object region with respect to the whole image.

CITATION LIST

Patent Literature

Patent Literature 1: JP 2012-83848A

SUMMARY OF INVENTION

Technical Problem

However, sometimes image failure is caused by highlighting an image. For example, when brightness is increased for an image, sometimes blown out highlights are generated. Further, on the contrary, in a proposal described in Patent Literature 1, sometimes a sufficient effect is not obtained depending on an image.

The present disclosure has been achieved in view of such a situation, and it is possible to highlight a main object more outstandingly in an image.

Solution to Problem

An image processing apparatus of an aspect of the present disclosure includes: a tone curve adjustment unit to perform tone curve adjustment on at least one of a main object region and an other region, which is a region other than the main object region, in an image; and a contrast adjustment unit to perform contrast enhancement on a region where the tone curve adjustment has been performed by the tone curve adjustment unit.

The tone curve adjustment unit may perform the tone curve adjustment to make the main object region brighter.

The tone curve adjustment unit may perform the tone curve adjustment to make the main object region brighter after dynamic range adjustment.

The tone curve adjustment unit may perform the tone curve adjustment to make the main object region brighter according to brightness of the other region.

The tone curve adjustment unit may perform the tone curve adjustment to make the main object region brighter according to user operation.

The tone curve adjustment unit may perform the tone curve adjustment to make the other region darker.

The tone curve adjustment unit may perform the tone curve adjustment to make the other region darker after dynamic range adjustment.

The tone curve adjustment unit may perform the tone curve adjustment to make the other region darker or brighter according to brightness of the other region.

The tone curve adjustment unit may perform the tone curve adjustment to make the other region darker or brighter according to user operation.

The tone curve adjustment unit may perform the tone curve adjustment to make a part other than a bright part darker in the other region.

The contrast adjustment unit may prohibit the contrast enhancement on the other region when the other region is included in a region where the tone curve adjustment has been performed by the tone curve adjustment unit.

The tone curve adjustment unit may perform the tone curve adjustment to make the main object region brighter and to make the other region darker.

The contrast adjustment unit may perform the contrast enhancement in which a contrast enhancement characteristic is changeable for each region according to an average value of local regions in the image.

The contrast adjustment unit may include a local level adjustment unit to adjust the average value of local regions in the image, and perform the contrast enhancement in which the contrast enhancement characteristic is changeable for each region according to the average value of local regions in the image adjusted by the local level adjustment unit.

The local level adjustment unit may adjust the average value of local regions in the image with a characteristic according to a brightness distribution bias.

The local level adjustment unit may adjust the average value of local regions in the image according to user operation.

The main object region may include a face region and a region where extension is performed from the face region in a body direction.

An amount of the extension may become smaller as a size of the face region becomes larger.

An image processing method of an aspect of the present disclosure includes: performing, by an image processing apparatus, tone curve adjustment on at least one of a main object region and an other region, which is a region other than the main object region, in an image; and performing, by the image processing apparatus, contrast enhancement on a region where the tone curve adjustment has been performed.

A program of an aspect of the present disclosure causes a computer to function as: a tone curve adjustment unit to perform tone curve adjustment on at least one of a main object region and an other region, which is a region other than the main object region, in an image; and a contrast adjustment unit to perform contrast enhancement on a region where the tone curve adjustment has been performed by the tone curve adjustment unit.

In an aspect of the present disclosure, the tone curve adjustment is performed on at least one region of a main object region and the other region, which is a region other than the main object region, in an image. Then, the contrast enhancement is performed on a region where the tone curve adjustment has been performed.

Advantageous Effects of Invention

According to the present disclosure, it is possible to perform the tone curve adjustment and the contrast enhancement of an image. In particular, according to the present disclosure, it is possible to highlight a main object more outstandingly in an image.

DESCRIPTION OF EMBODIMENTS

Hereinafter, there will be explained a mode for carrying out the present disclosure (in the following, called an embodiment). Note that the explanation will be made in the following order.

0. Outline
1. First Embodiment (Image Processing Apparatus)
2. Second Embodiment (Image Processing Apparatus)
3. Third Embodiment (Variation Example)
4. Fourth Embodiment (Computer)

<0. Outline>

[Outline of the Present Technique]

Figure 1:
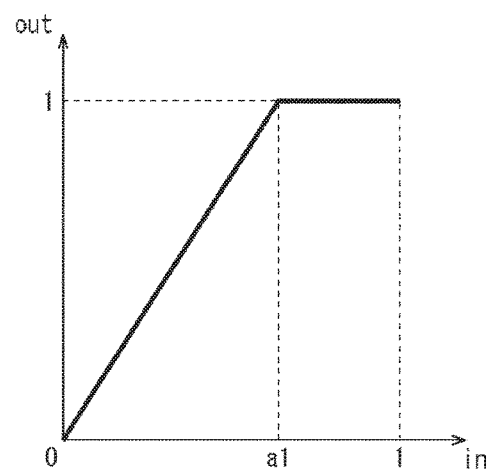
FIG. 1 is a diagram to show an input-output relationship when a gain is applied.

A method of applying a gain to a signal is an example of the method of increasing the brightness of an image for highlighting a main object. A characteristic example when a gain is applied is shown in FIG. 1. In the example of FIG. 1, the horizontal axis expresses a value (level) of an input signal and the vertical axis expresses a value (level) of an output signal. Here, the signal is assumed to take a value from 0 to 1.

In the example of FIG. 1, blown out highlights are generated in a part where the input signal has a value not smaller than a1 (0<a1<1).

Figure 2:
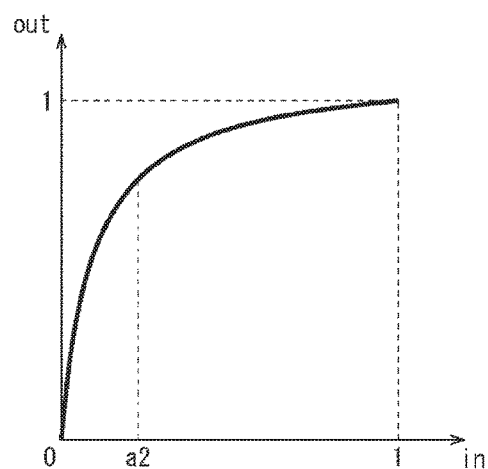
FIG. 2 is a diagram to show an input-output relationship when a tone curve is applied.

Further, as another example, a tone curve as shown in FIG. 2 is applied to the signal. In the case of an example of FIG. 2, while the blown out highlights are not generated as shown in FIG. 1, contrast is degraded in a part where the slope of the tone curve is smaller than one, that is, the input signal has a value not smaller than a2 (0<a2<1).

Figure 3:
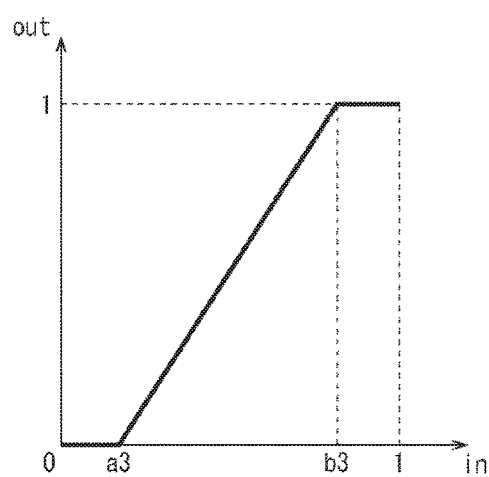
FIG. 3 is a diagram to show an input-output relationship when contrast adjustment is performed.

In such a case, as shown in FIG. 3, it is possible to increase the contrast. When the contrast is increased as in the example of FIG. 3, blocked up shadows are generated in a part where the input signal has a value not larger than a3 (0<a3<b3<1), and the blown out highlights are generated in a part where the input signal has a value not smaller than b3.

That is, even when the tone curve as shown in FIG. 2 is used for suppressing the blown out highlights, the contrast is degraded, and when the contrast enhancement as shown in FIG. 3 is performed for correcting the contrast degradation, the blown out highlights are generated finally. The contrast enhancement in this case is a typical contrast adjustment of enhancing a contrast by applying the gain of an output to an input.

For reducing the blown out highlights or the blocked up shadows generated by the typical contrast enhancement as above, it is effective to optimize the contrast enhancement characteristic in each part of an image. Such processing is called adaptive contrast adjustment in the present specification.

In the following, there will be explained an image processing apparatus to highlight a predetermined part of an image using the tone curve adjustment and the adaptive contrast adjustment.

<1. First Embodiment>

[Configuration Example of Image Processing Apparatus]

Figure 4:
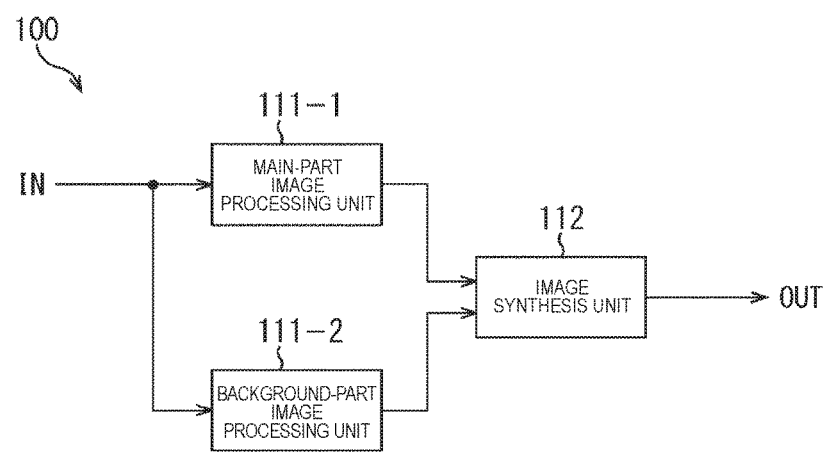
FIG. 4 is a block diagram to show a configuration example of an image processing apparatus to which the present technique is applied.

FIG. 4 is a block diagram to show an embodiment of an image processing apparatus to which the present technique is applied. The example of FIG. 4 shows an image processing apparatus 100 which highlights a predetermined part of an image using the tone curve adjustment and the adaptive contrast adjustment.

The image processing apparatus 100 is configured to include a main-part image processing unit 111-1, a background-part image processing unit 111-2, and an image combination unit 112.

An input image signal IN is supplied from an un-illustrated preceding stage to the main-part image processing unit 111-1 and the background-part image processing unit 111-2.

The main-part image processing unit 111-1 performs image processing using the tone curve adjustment and the adaptive contrast adjustment on a main object region of an image in the input image signal IN. For example, the main-part image processing unit 111-1 performs the tone curve adjustment of increasing the brightness of a main part. The main-part image processing unit 111-1 supplies the image signal after the image processing to the image combination unit 112.

The background-part image processing unit 111-2 performs image processing using the tone curve adjustment and the adaptive contrast adjustment on the other region, which is a region other than the main object region of the image, in the input image signal IN. For example, the background-part image processing unit 111-2 performs the tone curve adjustment to reduce the brightness of the background-part. The background-part image processing unit 111-2 supplies the image signal after the image processing to the image combination unit 112.

Note that, when the main-part image processing unit 111-1 performs the image processing, the background-part image processing unit 111-2 may not perform the image processing or may perform the image processing. On the contrary, when the background-part image processing unit 111-2 performs the image processing, the main-part image processing unit 111-1 may not perform the image processing or may perform the image processing. That is, in the image processing apparatus 100, image processing is performed by at least either one of the image processing units depending on the degree of enhancement of the main object.

Further, the main-part image processing unit 111-1 and the background-part image processing unit 111-2, while regions to be processed, parameter values (characteristics), desired effects to an image, and the like are different, have substantially the same configuration. Accordingly, in a case not necessarily to be distinguished in particular, each of the main-part image processing unit 111-1 and the background-part image processing unit 111-2 is generally called an individual-part image processing unit 111.

The image combination unit 112 creates a combination image using an image from the main-part image processing unit 111-1 (called a main-part image) for the main object region and using an image from the background-part image processing unit 111-2 (called a background image) for the region other than the main object region. Note that the boundary part between the main object region and the region other than the main object region may be combined so as to cause the main-part image and the background-part image to change gradually.

The image combination unit 112 supplies a signal of the created combination image to an un-illustrated succeeding stage as an output image signal OUT.

Note that, in the example of FIG. 4, the image combination unit 112 is explained as an example of combining images for each picture. However, it is also possible that the image combination unit 112 is configured as a switch, for example, and switches a pixel of the main-part image and a pixel of the background-part image depending on the region to output the pixel to the succeeding stage.

[Configuration of Individual-part Image Processing Unit]

Figure 5:
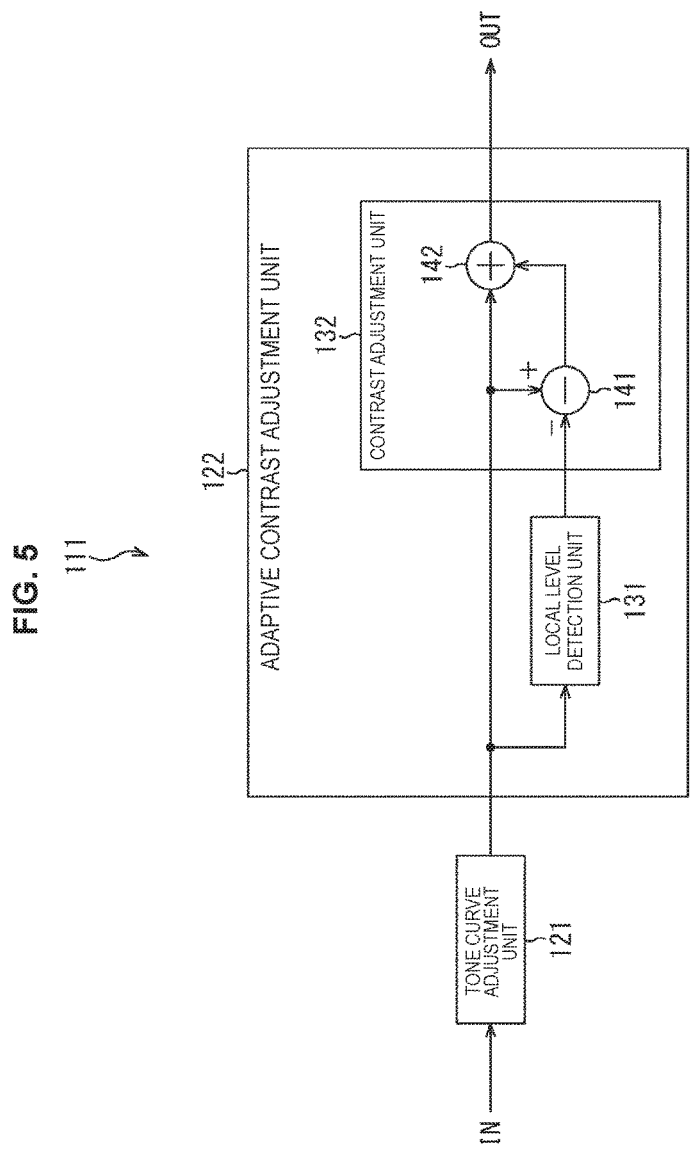
FIG. 5 is a block diagram to show a configuration of an individual-part image processing unit.

FIG. 5 is a block diagram to show a configuration of the individual-part image processing unit. Note that, in the example of FIG. 5, the main-part image processing unit 111-1 and the background-part image processing unit 111-2 will be explained together for a common part and the like. Each configuration example of the main-part image processing unit 111-1 and the background-part image processing unit 111-2 will be described below with reference to FIG. 28 and FIG. 29.

In the example of FIG. 5, the individual-part image processing unit 111 is configured to include a tone curve adjustment unit 121 and an adaptive contrast adjustment unit 122.

The tone curve adjustment unit 121 performs the tone curve adjustment on a target region of the input image signal IN, and supplies the image signal after the tone curve adjustment to the adaptive contrast adjustment unit 122.

The adaptive contrast adjustment unit 122 performs the adaptive contrast adjustment on the region where the tone curve adjustment has been performed by the tone curve adjustment unit 121. The adaptive contrast adjustment unit 122 supplies the output image signal OUT after the adaptive contrast adjustment to the succeeding stage.

The adaptive contrast adjustment unit 122 is configured to include a local level detection unit 131 and a contrast adjustment unit 132, in the example of FIG. 5.

The local level detection unit 131 obtains a level of the peripheral region of a pixel of interest (in the following, called a local level), and is configured with a low-pass filter, for example. The local level detection unit 131 may not be configured with a low-pass filter if the local level can be extracted.

In the local level detection unit 131, contrast is enhanced in a lower frequency range as the cut-off frequency is lower in the low-pass filter. As the low-pass filter, it is preferable to use a filter to obtain an average across a region larger than approximately 1/100 (area ratio) of an image size.

Figure 6:
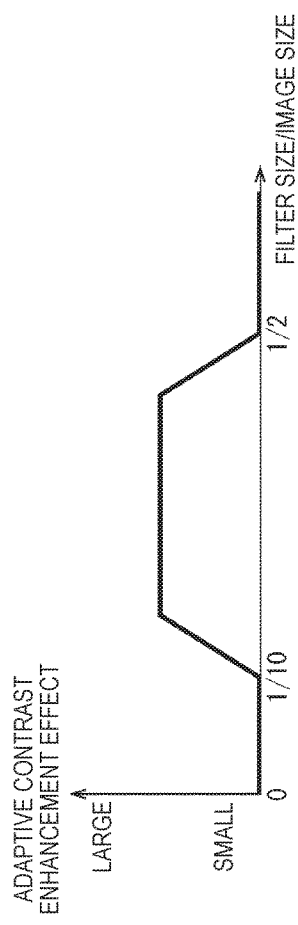
FIG. 6 is a diagram to explain a filter size.

For example, as shown in FIG. 6, it is preferable to use a filter size of approximately 1/10 to 1/2 of a short-side size of an image. For a filter size smaller than this size, the enhancement comes close to detail enhancement and the contrast enhancement effect becomes weak. Further, for a filter size larger than the above size, the enhancement comes close to screen-uniform contrast enhancement, and the adaptive contrast enhancement is not realized. Note that, in the above size range, specifically it is preferable to use a filter size of approximately ⅕ of a short-side size of an image, for example.

The local level detection unit 131 outputs an obtained local level signal (e.g., average value of the local levels) to a subtracter 141 of the contrast adjustment unit 132.

The contrast adjustment unit 132 subtracts the local level signal from the image signal after the tone curve adjustment, and adds the result to the image signal after the tone curve adjustment to obtain the output image signal OUT.

Specifically, the contrast adjustment unit 132 is configured with the subtracter 141 and an adder 142. That is, the subtracter 141 subtracts the local level signal from the image signal after the tone curve adjustment and outputs the result to the adder 142. The adder 142 adds the subtraction result by the subtracter 141 to the image signal after the tone curve adjustment, and outputs the resultant output image signal OUT to the succeeding stage.

Figure 7:
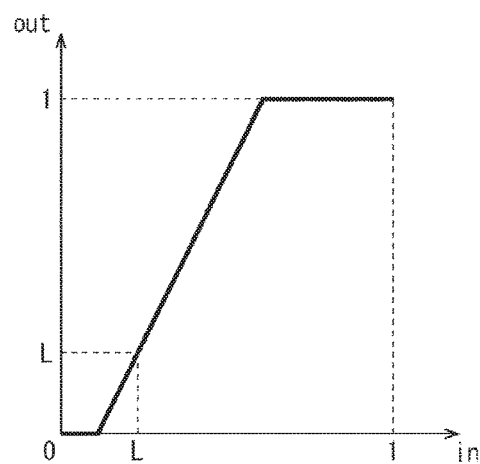
FIG. 7 is a diagram to show a characteristic of contrast adjustment processing when an image signal exhibits values in a low level region.

The characteristic of the processing in the contrast adjustment unit 132 will be explained with reference to FIG. 7 to FIG. 9. For a region where the image signal has low levels, the local level L is low and the characteristic as shown in FIG. 7 is obtained, for example, and the contrast enhancement in which a blocked up shadow range is narrow and a blown out highlight range is wide is performed in the contrast adjustment unit 132. In this case, however, the image signal has small values in the region and therefore the signal seldom has a value in the blown out highlight range, and resultantly the contrast adjustment can be performed so as unlikely to generate the blocked up shadows and also the blown out highlights.

Figure 8:
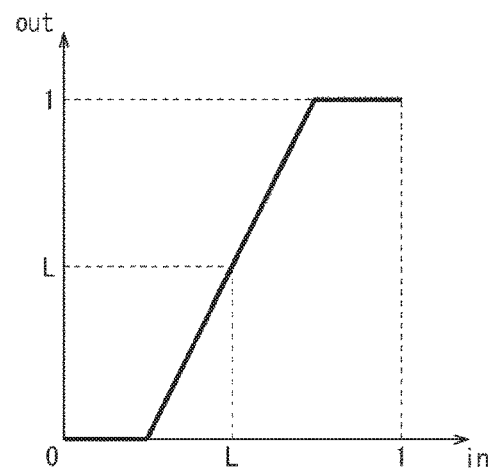
FIG. 8 is a diagram to show a characteristic of contrast adjustment processing when an image signal exhibits values in a middle level region.

For a region where the image signal has values in a middle level, the local level L is middle and the characteristic as shown in FIG. 8 is obtained, for example, and therefore the contrast enhancement in which the blocked up shadow range and the blown out highlight range are approximately the same is performed in the contrast adjustment unit 132. In this case, however, the image signal has middle values in the region and therefore the blocked up shadow range and the blown out highlight range are narrow, and resultantly the contrast enhancement can be performed so as unlikely to generate the blocked up shadows and the blown out highlights.

Figure 9:
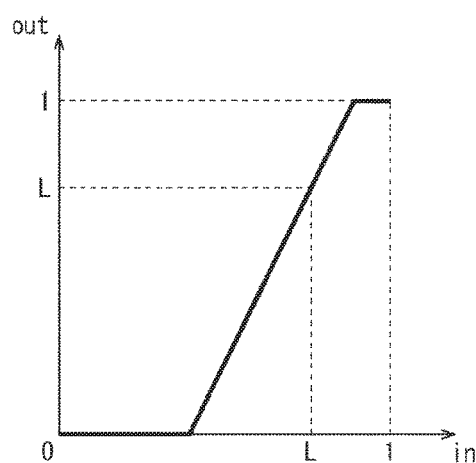
FIG. 9 is a diagram to show a characteristic of contrast adjustment processing when an image signal exhibits values in a high level region.

For a region where the image signal has values in a high level, the local level L is high and the characteristic as shown in FIG. 9 is obtained, for example, and the contrast enhancement in which the blocked up shadow range is wide and the blown out highlight range is narrow is performed in the contrast adjustment unit 132. In this case, however, the image signal has high values in the region and therefore the signal seldom has a value in the blocked up shadow range, and resultantly the contrast adjustment can be performed so as unlikely to generate the blocked up shadows and the blown out highlights.

As above, the contrast adjustment unit 132 performs the adaptive contrast enhancement according to the local level from the local level detection unit 131. Thereby, it is possible to perform the contrast adjustment so as unlikely to generate the blown out highlights and the blocked up shadows.

[Configuration of Tone curve Adjustment Unit]

Figure 10:
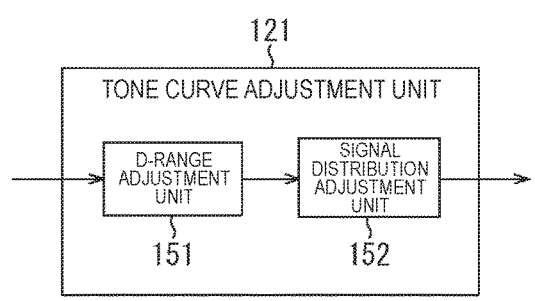
FIG. 10 is a block diagram to show a configuration example of a tone curve adjustment unit.

FIG. 10 is a block diagram to show a configuration example of the tone curve adjustment unit in FIG. 5.

In the example of FIG. 10, the tone curve adjustment unit 121 is configured to include a dynamic range (D-range) adjustment unit 151 and a signal distribution adjustment unit 152.

The D-range adjustment unit 151 adjusts the dynamic range of an image in the input image signal IN. The D-range adjustment unit 151 supplies the image signal after the dynamic range adjustment of the image to the signal distribution adjustment unit 152.

Figure 11:
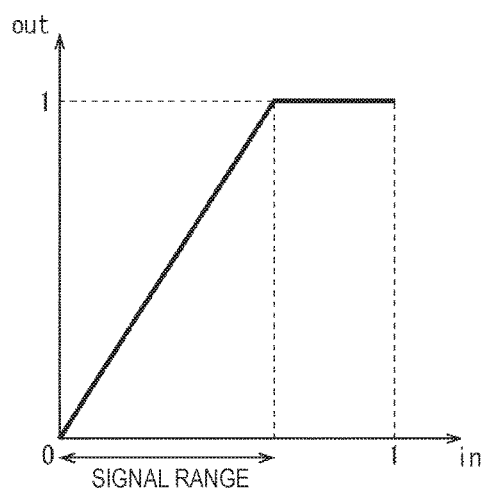
FIG. 11 is a diagram to show a characteristic of dynamic range adjustment processing when input image signals exhibit values biased in a low level.
Figure 12:
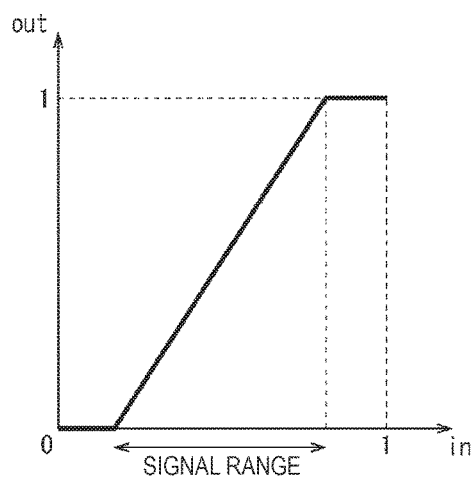
FIG. 12 is a diagram to show a characteristic of dynamic range adjustment when input image signals exhibit values biased in middle levels.

The example of FIG. 11 shows an example of expanding biasedly distributed signal values across the whole dynamic range when the original image signal (input image signal IN) has values distributed biasedly in a low level. The example of FIG. 12 shows an example of expanding biasedly distributed signal values across the whole dynamic range when the original image signal (input image signal IN) is distributed biasedly in a middle level.

In this manner, the D-range adjustment unit 151 detects the distribution of the image signal levels and adjusts the signal levels so as to utilize the dynamic range effectively. Note that the detection of the image signal distribution may be performed for the whole screen or may be performed for a limited specific region.

The signal distribution adjustment unit 152 adjusts the signal distribution of the image signal and highlights an image. The highlighted image is supplied to the adaptive contrast adjustment unit 122.

Figure 13:
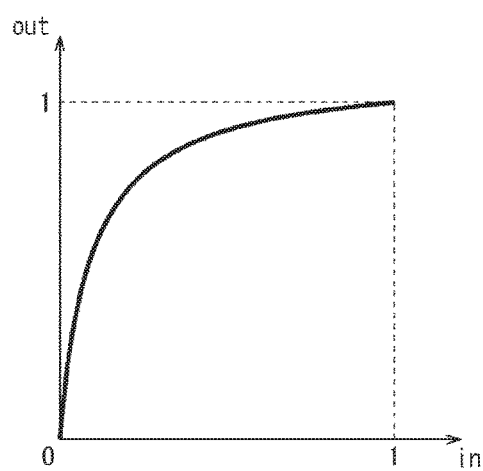
FIG. 13 is a diagram to show a characteristic of signal distribution adjustment processing when a main object region of an image is to be processed.

The example of FIG. 13 shows an example of highlighting an image (main object region thereof) by lifting the average value of the signal levels by the signal distribution adjustment unit 152 to increase brightness, as an example when a main object region of an image is to be processed.

As above, the signal of image highlighted by the signal distribution adjustment unit 152 is supplied to the adaptive contrast adjustment unit 122.

[Example of Image Processing]

Next, there will be explained the image processing by the image processing apparatus 100 of FIG. 4 with reference to the flowchart of FIG. 14.

The input image signal IN is supplied from the un-illustrated preceding stage to the main-part image processing unit 111-1 and the background-part image processing unit 111-2.

In step S111, the main-part image processing unit 111-1 performs main-part image processing. Further, in step S112, the background-part image processing unit 111-2 performs background-part image processing. Note that these main-part image processing and the background-part image processing will be described in detail as individual-part image processing with reference to FIG. 15.

Step S111 performs the image processing using the tone curve adjustment and the adaptive contrast adjustment on the main object region, and the image signal after the image processing is supplied to the image combination unit 112. Similarly, Step S112 performs the image processing using the tone curve adjustment and the adaptive contrast adjustment on the region other than the main object region, and the image signal after the image processing is supplied to the image combination unit 112.

Note that the processes of steps S111 and S112 may be performed in parallel. Alternatively, by external control or the like, either of the processes may be performed, and the input image signal IN may be supplied to the image combination unit 112 as it is, in the other process.

In step S113, the image combination unit 112 combines images. That is, the image combination unit 112 creates the combination image using the main-part image from the main-part image processing unit 111-1 and the background-part image from the background-part image processing unit 111-2. The created combination image signal is supplied to the un-illustrated succeeding stage as the output image signal OUT.

[Example of Individual-Part Image Processing]

Next, there will be explained the individual-part image processing of steps S111 and S112 in FIG. 14 with reference to the flowchart of FIG. 15.

In step S131, the D-range adjustment unit 151 adjusts the dynamic range of the image of the input image signal IN. The D-range adjustment unit 151 supplies the image signal after the dynamic range adjustment of the image to the signal distribution adjustment unit 152.

In step S132, the signal distribution adjustment unit 152 adjusts the signal distribution of the image signal to highlight the image. For example, the signal distribution adjustment unit 152 performs the adjustment for highlighting the main object region by lifting the average value of the signal levels to increase brightness. The highlighted image is supplied to the adaptive contrast adjustment unit 122.

In step S133, the local level detection unit 131 detects the local level which is a level of the peripheral region of a pixel of interest. The local level detection unit 131 outputs the detected local level signal (e.g., average value of the local levels) to the contrast adjustment unit 132.

In step S134, the contrast adjustment unit 132 performs the contrast adjustment by subtracting the local level signal from the image signal after the tone curve adjustment, and adding the result to the image signal after the tone curve adjustment to obtain the output image signal OUT.

That is, the subtracter 141 subtracts the local level signal from the image signal after the tone curve adjustment, and outputs the result to the adder 142. The adder 142 adds the subtraction result by the subtracter 141 to the image signal after the tone curve adjustment and outputs the resultant output image signal OUT to the succeeding stage.

Thereby, as described above with reference to FIG. 7 to FIG. 9, the adaptive contrast adjustment is performed according to the detected local level, and resultantly the contrast enhancement can be performed so as unlikely to generate the blocked up shadows and the blown out highlights. Further, the enhancement is performed after the main object region is highlighted, and therefore it is possible to highlight the main object more outstandingly in the image.

[Another Example of Adaptive Contrast Adjustment Unit]

Figure 16:
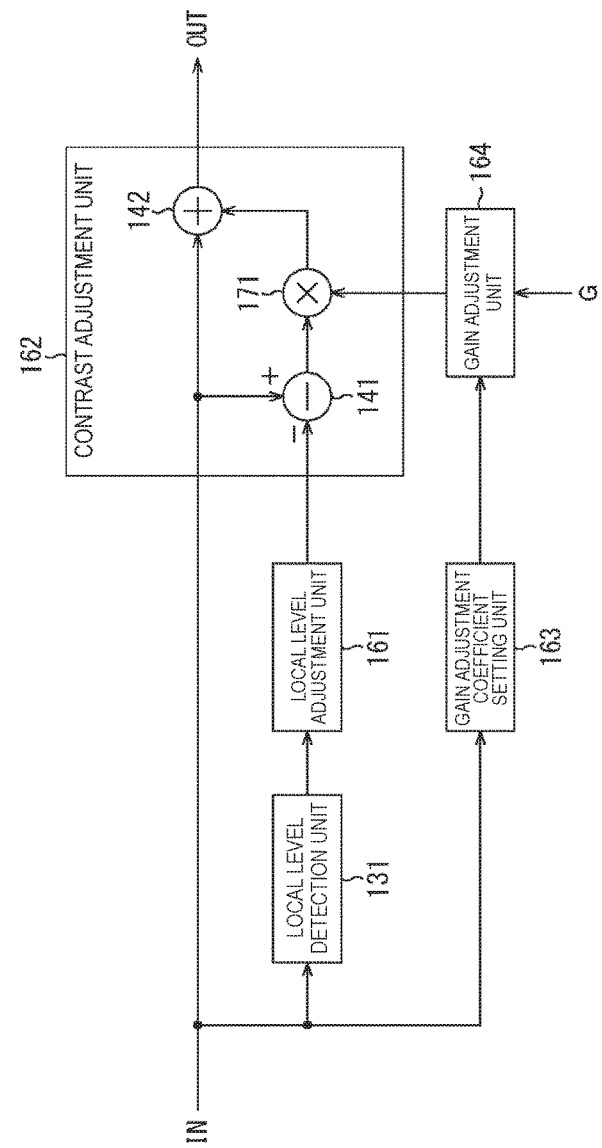
FIG. 16 is a block diagram to show another example of an adaptive contrast adjustment unit.

FIG. 16 is a block diagram to show another configuration example of the adaptive contrast adjustment unit of FIG. 5.

In the example of FIG. 16, the adaptive contrast adjustment unit 122 is configured to include the local level detection unit 131, a local level adjustment unit 161, a contrast adjustment unit 162, a gain adjustment coefficient setting unit 163, and a gain adjustment unit 164.

The adaptive contrast adjustment unit 122 of FIG. 16 is the same as the adaptive contrast adjustment unit 122 of FIG. 5 in the point that the local level detection unit 131 is provided.

The adaptive contrast adjustment unit 122 of FIG. 16 is different from the adaptive contrast adjustment unit 122 of FIG. 5 in the point that the contrast adjustment unit 132 is replaced by the contrast adjustment unit 162. The adaptive contrast adjustment unit 122 of FIG. 16 is different from the adaptive contrast adjustment unit 122 of FIG. 5 in the point that the local level adjustment unit 161, the gain adjustment coefficient setting unit 163, and the gain adjustment unit 164 are provided.

That is, the local level signal from the local level detection unit 131 is supplied to the local level adjustment unit 161.

The local level adjustment unit 161 adjusts the local level obtained by the local level detection unit 131. The local level adjustment unit 161 supplies the adjusted local level signal to the contrast adjustment unit 162.

The contrast adjustment unit 162 subtracts the local level signal from the image signal after the tone curve adjustment, and adds the result to which a gain is applied to the image signal after the tone curve adjustment to obtain the output image signal OUT.

Specifically, the contrast adjustment unit 162 is the same as the contrast adjustment unit 132 of FIG. 5 in the point that the subtracter 141 and the adder 142 are provided. The contrast adjustment unit 162 is different from the contrast adjustment unit 132 of FIG. 5 in the point that a multiplier 171 is added for multiplying the gain from the gain adjustment unit 164.

That is, the subtracter 141 subtracts the local level signal from the image signal after the tone curve adjustment, and outputs the result to the multiplier 171. The multiplier 171 multiplies the subtraction result from the subtracter 141 by the gain from the gain adjustment unit 164. The multiplier 171 outputs the result multiplied by the gain to the adder 142. The adder 142 adds the gain multiplication result from the multiplier 171 to the image signal after the tone curve adjustment, and outputs the resultant output image signal OUT to the succeeding stage.

Further, in the example of FIG. 16, the input image signal IN from the preceding stage is supplied to the local level detection unit 131 and the gain adjustment coefficient setting unit 163.

The gain adjustment coefficient setting unit 163 obtains and sets a coefficient to adjust the gain according to the input image signal IN, and supplies the set coefficient to the gain adjustment unit 164.

The gain adjustment unit 164 multiplies a preliminarily set gain G by the coefficient obtained in the gain adjustment coefficient setting unit 163 to adjust the gain. The gain adjusted by the gain adjustment unit 164 is supplied to the multiplier 171 of the contrast adjustment unit 162.

[Local Level Adjustment]

Figure 17:
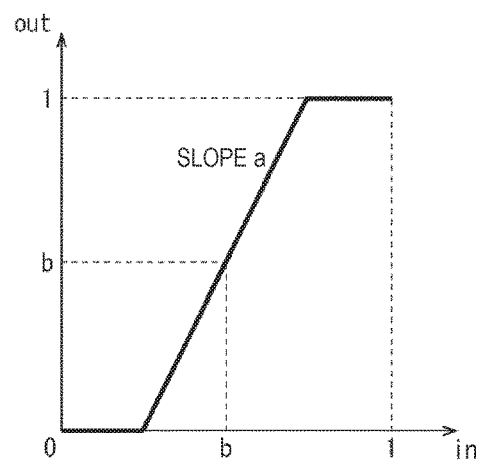
FIG. 17 is a diagram to show a characteristic example of local level adjustment.

Here, there will be explained the local level adjustment unit 161. In the example of FIG. 17, the solid line expresses an example of the characteristic of the local level adjustment unit 161.

That is, the local level adjustment unit 161 makes an output signal level (in the following, called an output level) smaller than an input signal level (in the following, called an input level) when the input level is smaller than b. Further, the local level adjustment unit 161 makes the output level larger than the input level when the input level is larger than b.

When the local level adjustment like this is performed, in the region where the image signal has values in a low level, the characteristic shown in FIG. 7 in which the local level L is shifted to a lower level is obtained, for example, and the blocked up shadows are reduced.

Further, in the region where the image signal has values in a high level, the local level becomes larger and the characteristic shown in FIG. 9 in which the local level L is shifted to a higher level is obtained and the blown out highlights are reduced.

These effects become more outstanding as the slope a shown in FIG. 17 becomes larger.

Figure 18:
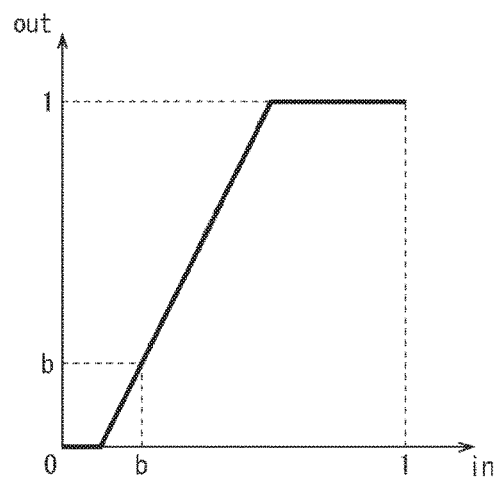
FIG. 18 is a diagram to show a characteristic example of local level adjustment.

Further, the characteristic of the local level adjustment unit 161 is also expresses as the solid line in the example of FIG. 18, for example. In the example of FIG. 18, b is set to be smaller than in the example of FIG. 17.

When the local level adjustment like this is performed, the effect of further increasing the local level when the local level is high becomes stronger, and therefore it is possible to emphasize the effect of reduction of the blown out highlights more than the reduction of the blocked up shadows.

Figure 19:
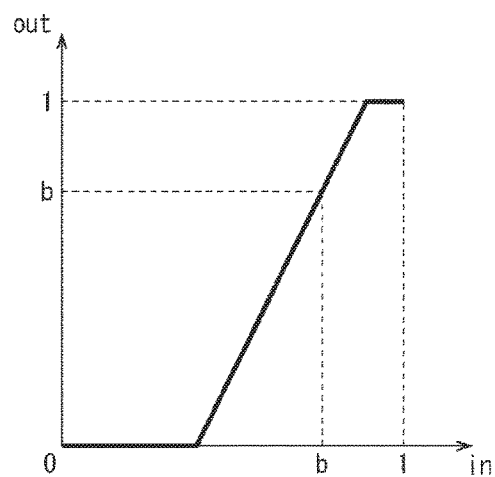
FIG. 19 is a diagram to show a characteristic example of local level adjustment.

Further, the characteristic of the local level adjustment unit 161 is expressed as the solid line in FIG. 19, for example. In the example of FIG. 19, b is set to be larger than in the example of FIG. 17.

When the local level adjustment like this is performed, the effect of further reducing the local level when the local level is low becomes stronger, and therefore it is possible to emphasize the effect of the reduction of the blocked up shadows more than the reduction of the blown out highlights. As above, the local level (e.g., average value of the local regions) of the image is adjusted with a characteristic according to the biased brightness distribution.

[Gain Adjustment Coefficient Setting]

Figure 20:
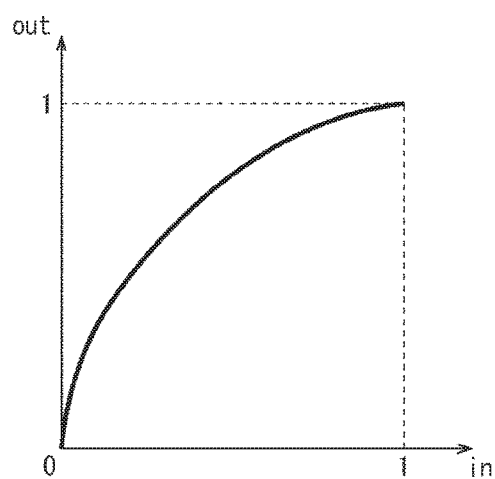
FIG. 20 is a diagram to show a characteristic example of gain adjustment coefficient setting.

Next, there will be explained the gain adjustment coefficient setting unit 163. In the example of FIG. 20, the solid line expresses a characteristic example of the gain adjustment coefficient setting unit.

The characteristic of the gain adjustment coefficient setting unit 163 is determined in consideration of the characteristic of the signal distribution adjustment unit 152. As described above, in the result of the signal distribution adjustment, contrast is degraded in a part having a smaller slope angle (i.e., having a higher signal level) in FIG. 13. Accordingly, when the gain adjustment coefficient setting unit 163 is caused to have a characteristic proportional to the reciprocal of the differentiated characteristic of FIG. 13, the total contrast enhancement characteristic becomes constant. As a result, it is possible to reduce the blocked up shadows when the gain is increased.

An example of such a characteristic is shown in FIG. 20. Further, in the characteristic shown in FIG. 21, the contrast enhancement effect becomes stronger than the characteristic shown in FIG. 20 in a part where the signal level is lower.

[Example of Individual-Part Image Processing]

Figure 22:
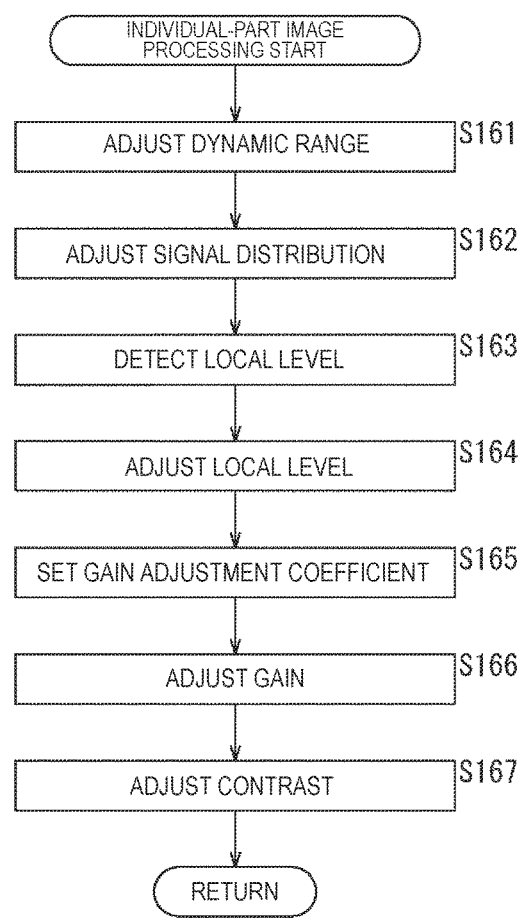
FIG. 22 is a flowchart to show another example of individual-part image processing.

Next, with reference to the flowchart of FIG. 22, there will be explained the individual-part image processing of steps S111 and S112 of FIG. 14.

In step S161, the D-range adjustment unit 151 adjusts the dynamic range of the image in the input image signal IN. The D-range adjustment unit 151 supplies the image signal after the dynamic range adjustment of the image to the signal distribution adjustment unit 152.

In step S162, the signal distribution adjustment unit 152 adjusts the signal distribution of the image signal to highlight the image. For example, the signal distribution adjustment unit 152 performs the adjustment of highlighting the main object region by lifting the average value of the signal levels to increase brightness. The highlighted image is supplied to the adaptive contrast adjustment unit 122.

In step S163, the local level detection unit 131 detects the local level which is a level of the peripheral region of a pixel of interest. The local level detection unit 131 outputs the detected local level signal to the local level adjustment unit 161.

In step S164, the local level adjustment unit 161 adjusts the local level obtained by the local level detection unit 131. The local level adjustment unit 161 supplies the adjusted local level signal to the contrast adjustment unit 162.

In step S165, the gain adjustment coefficient setting unit 163 obtains and sets a coefficient for adjusting the gain according to the input image signal IN from the signal distribution adjustment unit 152, and supplies the set coefficient to the gain adjustment unit 164.

In step S166, the gain adjustment unit 164 multiplies the preliminarily set gain G by the coefficient obtained in the gain adjustment coefficient setting unit 163 to adjust the gain. The gain adjusted by the gain adjustment unit 164 is supplied to the multiplier 171 in the contrast adjustment unit 162.

In step S167, the contrast adjustment unit 162 subtracts the local level signal from the image signal after the tone curve adjustment. Then, the contrast adjustment unit 162 adjusts (enhances) contrast by adding the result to which the gain is applied to the image signal after the tone curve adjustment to obtain the output image signal OUT.

That is, the subtracter 141 subtracts the local level signal from the image signal after the tone curve adjustment, and outputs the result to the multiplier 171. The multiplier 171 multiplies the subtraction result of the subtracter 141 by the gain from the gain adjustment unit 164. The multiplier 171 outputs the result multiplied by the gain to the adder 142. The adder 142 adds the gain multiplication result by the multiplier 171 to the image signal after the tone curve adjustment, and outputs the resultant output image signal OUT to the succeeding stage.

As above, since more adaptive contrast adjustment is performed according to the detected local level, resultantly it is possible to perform the contrast enhancement so as unlikely to generate the blocked up shadows and also the blown out highlights. Moreover, since the enhancement is performed after the main object region is highlighted, it is possible to highlight the main object more outstandingly in the image.

<2. Second Embodiment (Image Processing Apparatus)>

[Configuration Example of Image Processing Apparatus]

Figure 23:
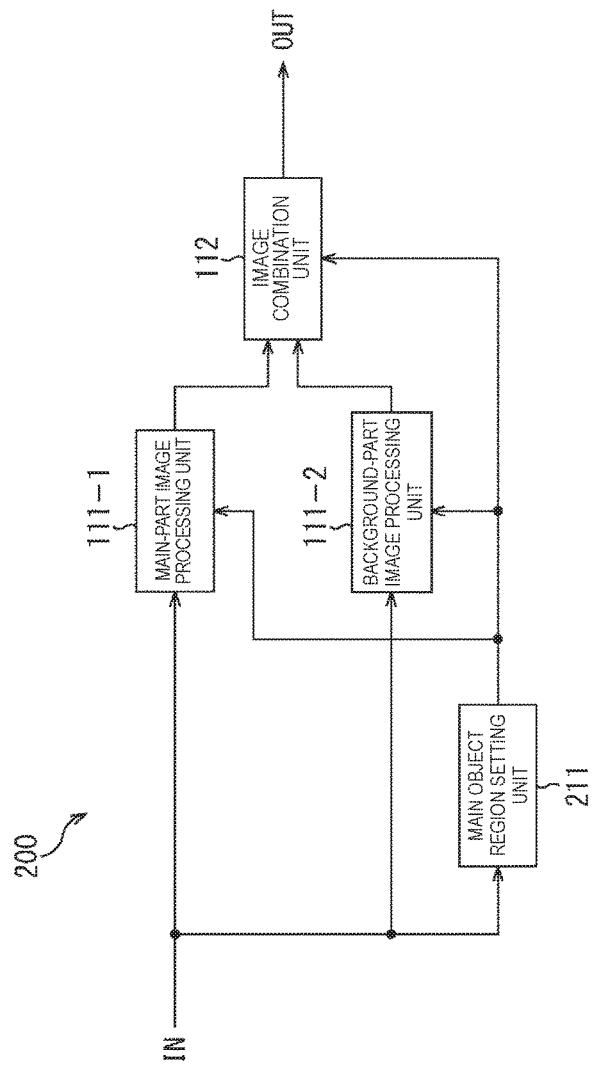
FIG. 23 is a block diagram to show another configuration example of an image processing apparatus to which the present technique is applied.

FIG. 23 is a block diagram to show another embodiment of the image processing apparatus to which the present technique is applied.

An image processing apparatus 200 of FIG. 23 is the same as the image processing apparatus 100 of FIG. 4 in the point that the main-part image processing unit 111-1, the background-part image processing unit 111-2, and the image combination unit 112 are provided. The image processing apparatus 200 of FIG. 23 is different from the image processing unit 100 of FIG. 4 in the point that a main object region setting unit 211 is added.

The main object region setting unit 211 detects the main object in the image, and sets a main object region supposed from detected main object information.

Specifically, the main object region setting unit 211 detects the main object in the image. While various methods are used for detecting the main object, here, the main object is assumed to be a person, for example, and a case of using face detection will be explained as an example. In this case, face region information is obtained by the face detection, and used as the main object information. Note that also a user can set the main object region.

Then, the main object region setting unit 211 sets the main object region, which is supposed from the main object information. When the main object detection is the face detection, a person region supposed from a face region is set as the main object region.

Figure 24:
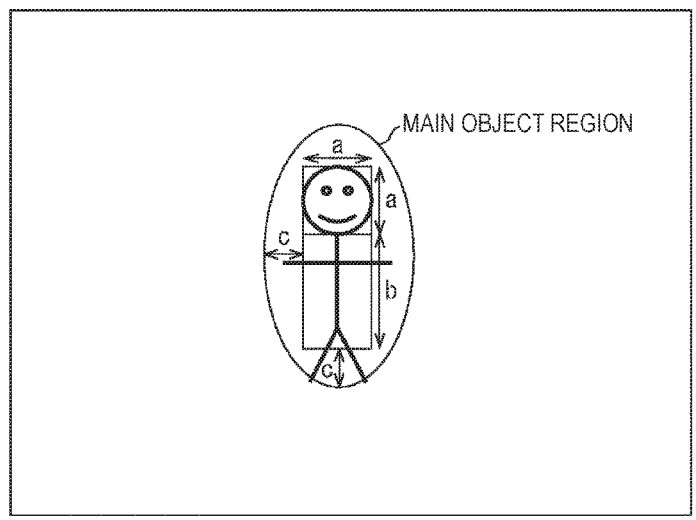
FIG. 24 is a diagram to explain main object region setting processing.

For example, the example of FIG. 24 shows an example of setting an ellipsoid having diameters which add additional values c to the sizes of a region configured with a face region a and an expansion region b (main axis: a+b+2c, minor axis: a+2c) as the main object region. This main object region is used for the case that a comparatively small object is captured, and the expansion region b is set to include down to the vicinity of the body.

Figure 25:
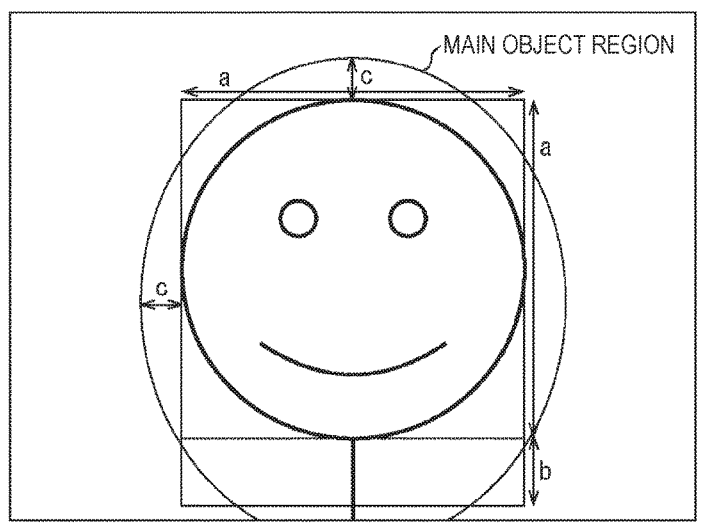
FIG. 25 is a diagram to explain main object region setting processing.

Further, for example, the example of FIG. 25 shows an example of setting an ellipsoid having diameters which add additional values c to the sizes of a region configured with a face region a and an expansion region b (major axis: a+b+2c, minor axis: a+2c) as the main object region. This main object region is used for the case that a comparatively large object is captured, and the expansion region b is set to include down to the vicinity of the neck.

Note that, when a medium size object is captured, preferably the expansion region b is set to include down to the vicinity of the breast.

Figure 26:
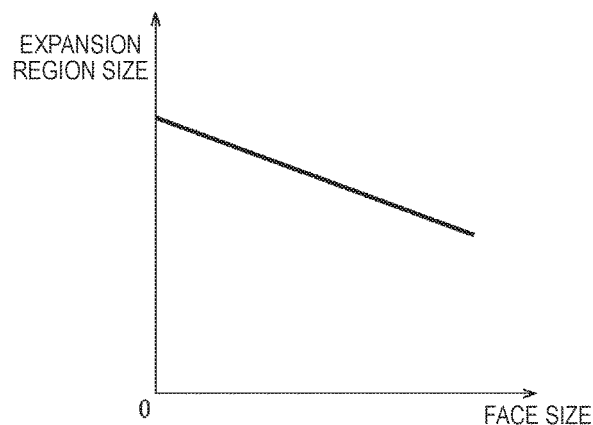
FIG. 26 is a diagram to show a relationship between an expansion region size and a face size in main object region setting processing.

In this manner, in the main object region setting unit 211, a larger expansion amount is set from the face region to the body region as the face size becomes smaller. In the example of FIG. 26, such characteristic is shown by the solid line.

Further, preferably the additional value c is set to be approximately constant, regardless of the face size.

Note that, when a plurality of main objects exist, a region combining these regions may be set to be the main object region, or any selected region may be set to be the main object region. When the main object is not detected, the main object region may be set in the vicinity of the screen center. Further, even when the main object is detected, for the case that it is biased to the edge of the screen, or the like, the region may be expanded in the screen center direction. Further, the detected main object may be set to be the main object region without expansion (i.e., the detected region may be used as the main object region as it is).

Further, boundary blurring may be performed on this main object region using a low-pass filter or the like.

[Example of Image Processing]

Figure 27:
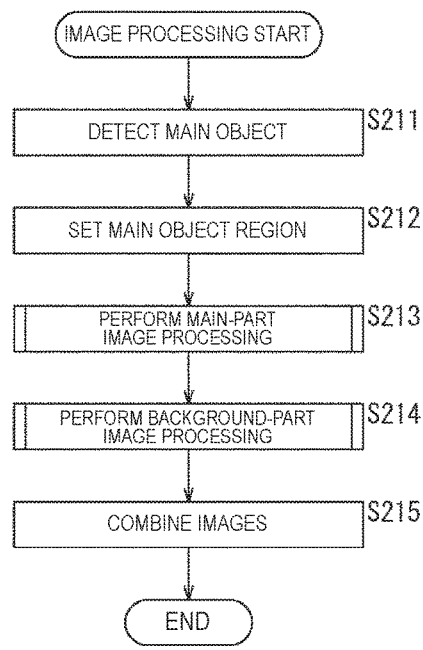
FIG. 27 is a flowchart to explain an image processing example in the image processing apparatus of FIG. 23.

Next, with reference to the flowchart of FIG. 27, there will be explained image processing by the image processing apparatus 200 of FIG. 23.

The input image signal IN is supplied from the un-illustrated preceding stage to the main object region setting unit 211, the main-part image processing unit 111-1, and the background-part image processing unit 111-2.

In step S211, the main object region setting unit 211 detects the main object of the image in the input image signal IN. For example, the face region information is obtained by the face detection to be used as the main object information.

Then, in step S212, the main object region setting unit 211 sets the main object region supposed from the main object information. For example, when the main object detection is the face detection, the person region supposed from the face region is set as the main object region.

In step S213, the main-part image processing unit 111-1 performs the main-part image processing. Further, in step S214, the background-part image processing unit 111-2 performs the background-part image processing. Note that these main-part image processing and background-part image processing perform substantially the same processing as the individual-part image processing described above with reference to FIG. 15, and therefore the repeated explanation thereof will be omitted.

Step S213 performs the image processing using the tone curve adjustment and the adaptive contrast adjustment on the main object region, and the image signal after the image processing is supplied to the image combination unit 112. Similarly, step S214 performs the image processing using the tone curve adjustment and the adaptive contrast adjustment on the region other than the main object region, and the image signal after the image processing is supplied to the image combination unit 112.

Figure 14:
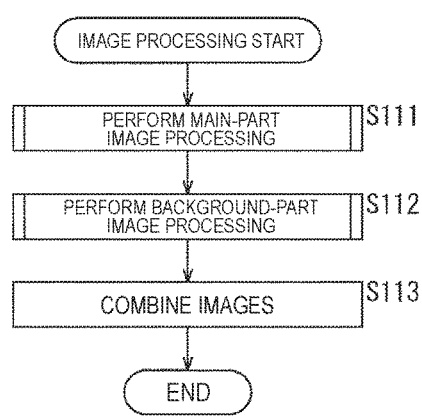
FIG. 14 is a flowchart to explain an image processing example in the image processing apparatus of FIG. 4.
Figure 15:
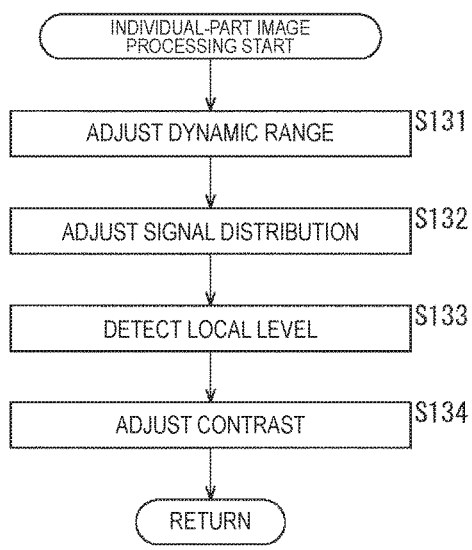
FIG. 15 is a flowchart to explain an example of individual-part image processing.

Note that, as in the example of FIG. 14, the processes of steps S213 and S214 may be performed in parallel or either one may be performed and the input image signal IN may be supplied to the image combination unit 112 as it is in the other one, by external control or the like.

In step S215, the image combination unit 112 combines images. That is, the image combination unit 112 creates the combination image using the main-part image from the main-part image processing unit 111-1 and the background-part image from the background-part image processing unit 111-2. The created combination image is supplied to the un-illustrated succeeding step as the output image signal OUT.

<3. Third Embodiment (Variation Example)>

[Configuration of Main-part Image Processing Unit]

Figure 28:
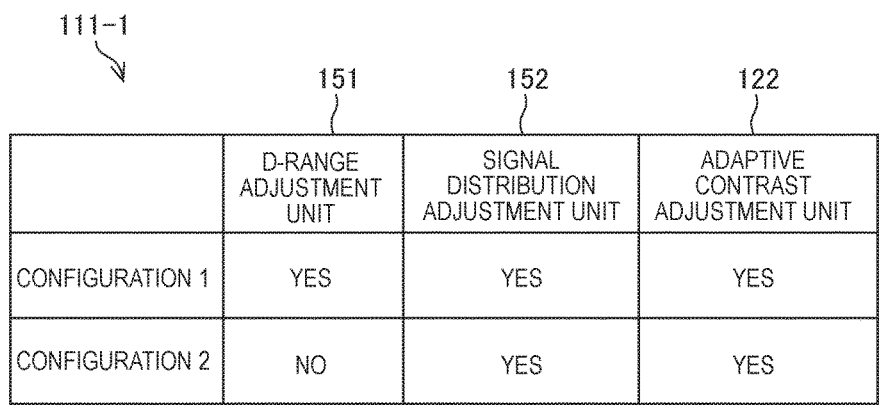
FIG. 28 is a diagram to show a configuration pattern of a main-part image processing unit.

FIG. 28 is a diagram to show a configuration pattern of the main-part image processing unit 111-1.

The main-part image processing unit 111-1 creates an image providing an outstanding impression by increasing image brightness and enhancing contrast.

The main-part image processing unit 111-1 is configured to include the D-range adjustment unit 151, the signal distribution adjustment unit 152, and the adaptive contrast adjustment unit 122 as described above with reference to FIG. 5 and FIG. 7, in configuration 1.

In this case, the D-range adjustment unit 151 detects the image signal distribution for the main object region of the image and adjusts the dynamic range as described above with reference to FIG. 11 and FIG. 12, for example. The signal distribution adjustment unit 152 highlights the image (main object region thereof) by lifting the average value of the signal levels using the characteristic as described in FIG. 13 to increase brightness, for example.

The adaptive contrast adjustment unit 122 performs the adaptive contrast adjustment as described above with reference to FIG. 7 to FIG. 9 to perform the contrast enhancement which reduces the blown out highlights and the blocked up shadows, for example.

Note that, as shown in configuration 2, the D-range adjustment unit 151 is not an essential constituent in the main-part image processing unit 111-1.

That is, the main-part image processing unit 111-1 is configured to include the signal distribution adjustment unit 152 and the adaptive contrast adjustment unit 122, in configuration 2.

Here, the D-range adjustment is effective when the brightness of an original image is distributed in a narrow range. For example, a hazy image becomes a haze-cleared image when the D-range adjustment is performed. That is, in the case of configuration 1, a clearer image is obtained for an image having a narrower brightness distribution range.

Accordingly, the configuration of the main-part image processing unit 111-1 is normally configuration 2, and automatically switched to configuration 1 when the brightness distribution range of an image is narrow.

Note that, in the adaptive contrast adjustment in the adaptive contrast adjustment unit 122, the characteristics shown in FIG. 7 to FIG. 9 are switched automatically by the output level L of the low-pass filter which serves as the local level detection unit 131.

Further, in the local level adjustment in the adaptive contrast adjustment unit 122, normally the characteristic of FIG. 17 is used among the characteristics shown in FIG. 17 to FIG. 19. Further, when the brightness distribution is biased to a high brightness, the characteristic is switched to the characteristic of FIG. 18 by emphasizing the reduction of the blown out highlights, and, when the brightness distribution is biased to a low brightness, the characteristic is switched to the characteristic of FIG. 19 by emphasizing the reduction of the blocked up shadows.

[Configuration of Background-Part Image Processing Unit]

Figure 29:
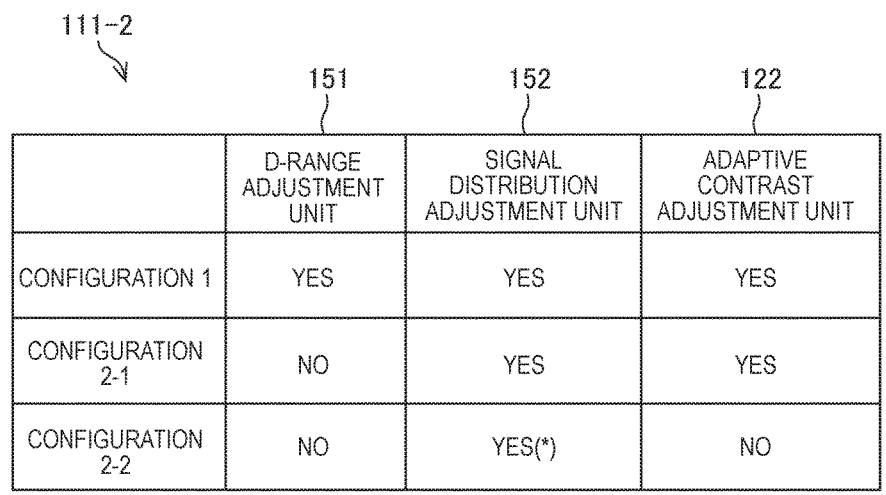
FIG. 29 is a diagram to show a configuration pattern of a background-part image processing unit.

FIG. 29 is a diagram to show a configuration pattern of the background-part image processing unit 111-2.

The background-part image processing unit 111-2 creates an image providing a more outstanding impression for a main part by enhancing contrast even while reducing the brightness of the image. Note that, while it is effective to simply reduce the brightness of the background for highlighting the main part outstandingly, when further the contrast is enhanced to generate a bright part in a dark image, an effect similar to a painting expression using shading is obtained.

The background-part image processing unit 111-2 is configured to include the D-range adjustment unit 151, the signal distribution adjustment unit 152, and the adaptive contrast adjustment unit 122 as described above with reference to FIG. 5 and FIG. 7, in configuration 1. Note that, while the configuration is the same as that of the main-part image processing unit 111-1 described above with reference to FIG. 28, the characteristic (parameter characteristic) thereof is different.

Figure 30:
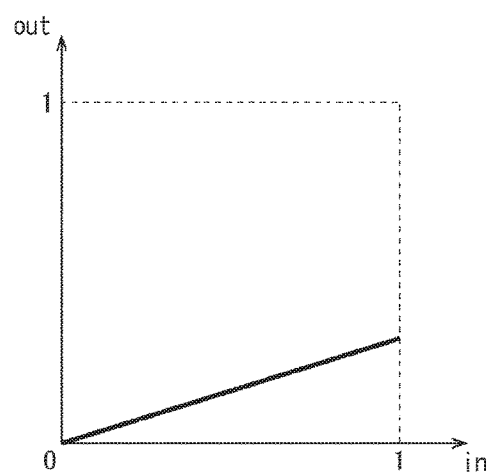
FIG. 30 is a diagram to show a characteristic example of signal distribution adjustment processing when a region other than a main object region of an image is to be processed.

That is, in this case, the D-range adjustment unit 151 detects the image signal distribution for the main object region of the image or the whole image, for example, and adjusts the dynamic range as described above with reference to FIG. 11 and FIG. 12. The signal distribution adjustment unit 152 lowers the signal level to reduce the brightness of the image using the characteristic as shown in FIG. 30, for example.

The adaptive contrast adjustment unit 122 performs the adaptive contrast adjustment as described above to perform the contrast enhancement which reduces the blown out highlights and the blocked up shadows, for example.

Note that, as shown in configuration 2-1 which corresponds to configuration 2 of FIG. 28, the D-range adjustment unit 151 is not an essential constituent in the background-part image processing unit 111-2. That is, in the case of configuration 2-1, the D-range adjustment unit 151 is not operated normally and passes through the signal.

Further, as shown in configuration 2-2 which is a variation of configuration 2-1, also the adaptive contrast adjustment unit 122 may not be operated in addition to the D-range adjustment unit 151 in the background-part image processing unit 111-2. In other words, the contrast enhancement may be prohibited for the region other than the main object region. That is, in this case, the signal distribution adjustment unit 152 can enhance the contrast by lowering the signal level to reduce brightness using a characteristic as shown in FIG. 31, for example, and also by causing an originally bright part not to become too dark.

Figure 32:
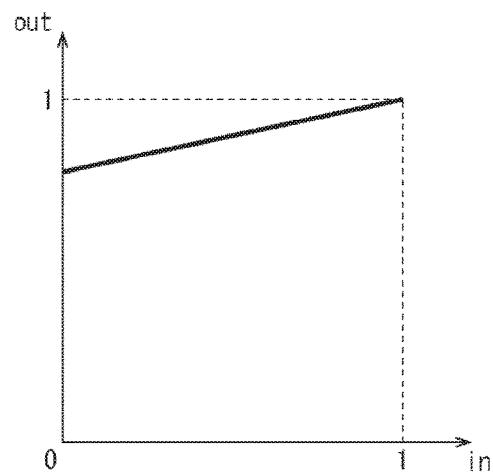
FIG. 32 is a diagram to show still another characteristic example of signal distribution adjustment processing when a region other than a main object region of an image is to be processed.

Moreover, when the characteristic of the signal distribution adjustment unit 152 is set to provide a very high brightness as shown in FIG. 32, for example, by means of changing a linear functional section in a plus direction, it is possible to obtain a main object enhancement effect by blowing out a background to a brighter side, different from reducing the brightness of the background.

Here, as in the main-part image processing unit 111-1, the configuration of the background-part image processing unit 111-2 is normally configuration 2-1 (or configuration 2-2), and automatically switched to configuration 1 when the brightness distribution range of the image is narrow.

Figure 31:
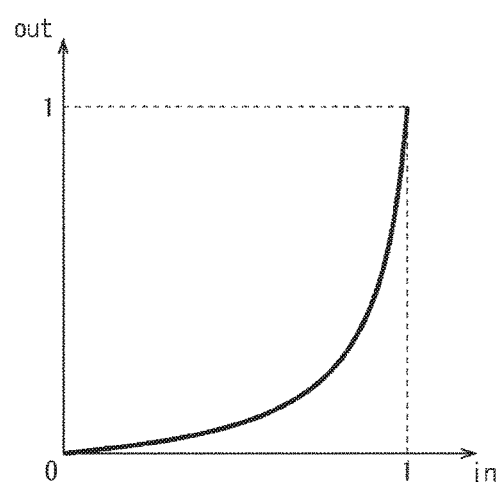
FIG. 31 is a diagram to show another characteristic example of signal distribution adjustment processing when a region other than a main object region of an image is to be processed.

Note that, in the signal distribution adjustment in the signal distribution adjustment unit 152, for the characteristics of FIG. 30 or FIG. 31 and FIG. 32, the characteristic is switched to the characteristic of FIG. 30 or FIG. 31 when the background is darker than a certain level, and switched to the characteristic of FIG. 32 when the background is brighter than a certain level.

Figure 21:
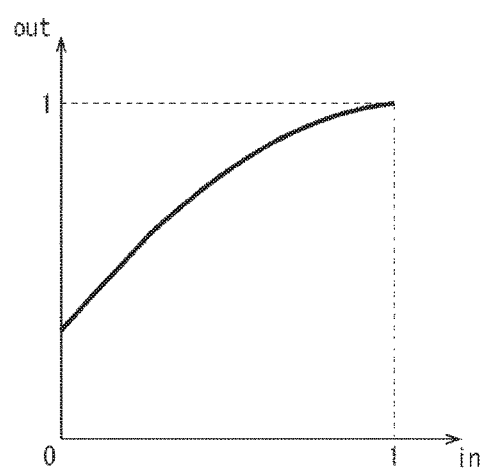
FIG. 21 is a diagram to show a characteristic example of gain adjustment coefficient setting.

Further, in the gain adjustment coefficient setting in the adaptive contrast adjustment unit 122, for the characteristics shown in FIG. 20 and FIG. 21, the characteristic is switched to the characteristic of FIG. 20 when a large amount of low brightness components exists, and switched to the characteristic of FIG. 21 when a small amount of low brightness components exists.

In the above, while the image processing to highlight the image is applied to a brightness signal, a color signal suitable to the brightness signal can be obtained when a gain corresponding to a resultant brightness change is applied to the color signal. That is, when the brightness signal is changed from Yin to Yout, the color signal suitable to the brightness signal can be obtained by applying a gain of Yout/Yin to the color signal. Note that, in this case, when the background is made brighter in the brightness signal, processing of removing colors only for the background part may be performed for the color difference signal.

As above, it is possible to highlight the main object outstandingly, by performing the contrast enhancement while making the main object region brighter. Further, it is possible to highlight the main object region more outstandingly by enhancing the contrast while reducing the brightness of the background region other than the main object region.

Moreover, it is possible to perform appropriate main object enhancement by the main object region setting suitable for a face size.

Note that, in the above explanation, the functions explained to be automatically switched depending on the image can be configured to be selectable by user operation.

Further, the present technique is applied not only to the image processing apparatus but also to an imaging apparatus, a server, and the like. Each of the image processing apparatus, the imaging apparatus, and the server, includes a photographing mode as follows, and the characteristic of the each processing unit configuring the above main-part or background-part image processing unit can be set depending on the photographing mode, for example.

[Photographing Mode]

A low contrast mode is a mode used for the case of a cloudy or hazy image, and when this mode is selected, the processing of the D-range adjustment unit 151 is performed.

Figure 33:
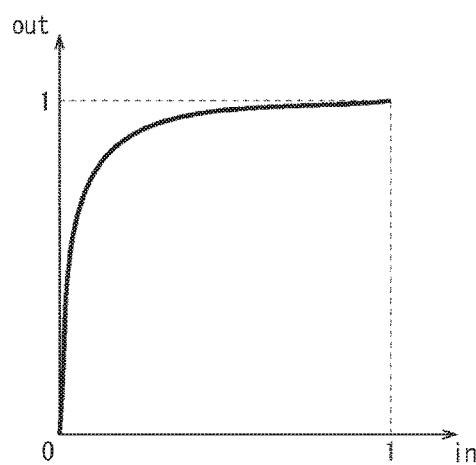
FIG. 33 is a diagram to show a characteristic example of signal distribution adjustment in a subject-part exposure-under mode.

A main subject part exposure-under mode is a mode selected for the case that a main subject part (major part) becomes darker than usual because of a bright background. When this mode is selected, as in the characteristic shown in FIG. 33, the effect of increasing brightness is enhanced in the signal distribution adjustment unit 152 in the main-part image processing unit 111-1. Further, as described above with reference to FIG. 19, the setting for emphasizing the reduction of the blocked up shadows is performed in the local level adjustment of the adaptive contrast adjustment unit 122.

Figure 34:
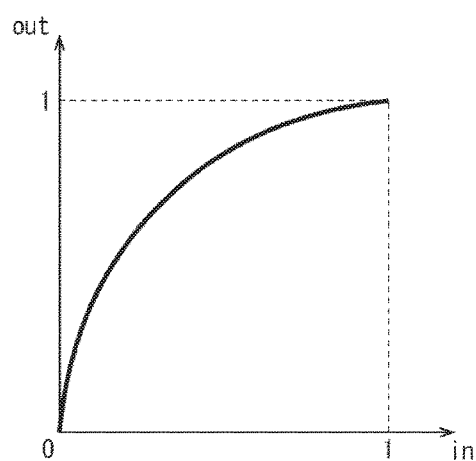
FIG. 34 is a diagram to show a characteristic example of signal distribution adjustment in a subject-part exposure-over mode.

A main subject part exposure-over mode is selected when a subject part becomes brighter than usual because of a dark background. When this mode is selected, as in the characteristic shown in FIG. 34, the effect of increasing brightness is weakened in the signal distribution adjustment unit 152 of the main-part image processing unit 111-1. Further, as described above with reference to FIG. 18, the setting for emphasizing the reduction of the blown out highlights is performed in the local level adjustment of the adaptive contrast adjustment unit 122.

While a normal mode reduces the brightness of the background, a background blowing out (background blown out highlight) mode is selected when the image is desired to be blown out into white. When this mode is selected, as in the characteristic shown in FIG. 32, the characteristic of largely increasing brightness is set in the signal distribution adjustment unit 152 of the background-part image processing unit 111-2. Note that, in this case, the gain applied to the color signal of the background part is reduced to perform the color removal.

The above four photographing modes are selectable for a user, and also can be selected by an automatic mode setting using image processing or the like.

Note that, in the background blowing out mode, the difference between the characteristic of FIG. 30 or FIG. 31 and the characteristic of FIG. 32 is the difference of whether the background is desired to be dark or bright. Accordingly, it is possible to use the characteristic of FIG. 30 or FIG. 31 when the background is darker than a certain level, and to use the characteristic of FIG. 32 when the background is brighter than a certain level, and automatic setting is possible.

Note that, while the example of dividing the image processing unit into two units of the main-part image processing unit 111-1 and the background-part image processing unit 111-2 is shown in the above image processing apparatuses of FIG. 4 and FIG. 23, the configuration is not limited to this example. For example, without the dividing of the image processing unit, the processing of one image processing unit may be switched to process the main-part image or the background-part image.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

<4. Fourth Embodiment (Computer)>

[Computer Configuration Example]

Figure 35:
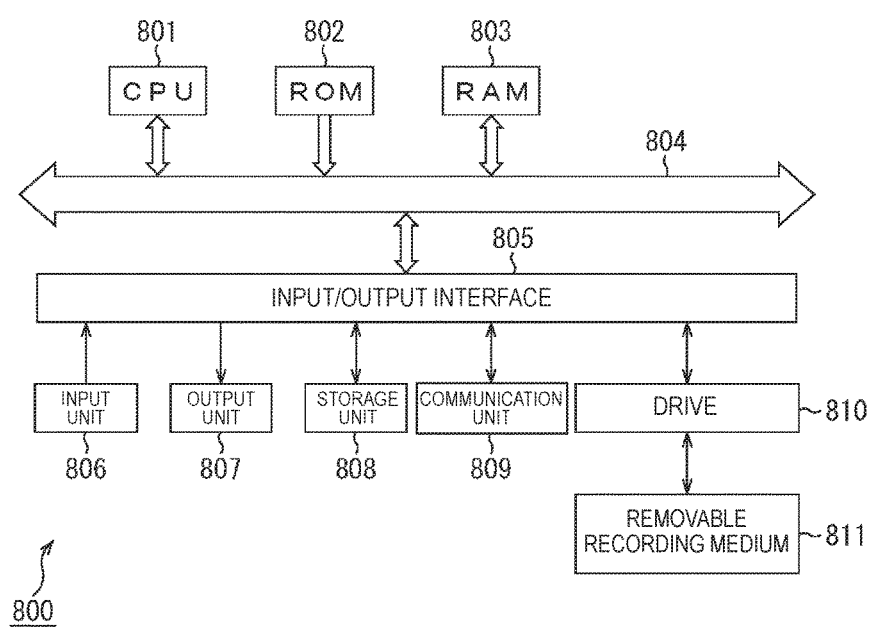
FIG. 35 is a block diagram to show a configuration example of a computer.

FIG. 35 shows an example configuration of the hardware of a computer that executes the series of processes described earlier according to a program.

In a computer 800, a CPU (Central Processing Unit) 801, a ROM (Read Only Memory) 802, and a RAM (Random Access Memory) 803 are mutually connected by a bus 804.

An input/output interface 805 is also connected to the bus 804. An input unit 806, an output unit 807, a storage unit 808, a communication unit 809, and a drive 810 are connected to the input/output interface 805.

The input unit 806 is configured from a keyboard, a mouse, a microphone or the like. The output unit 807 is configured from a display, a speaker or the like. The storage unit 808 is configured from a hard disk, a non-volatile memory or the like. The communication unit 809 is configured from a network interface or the like. The drive 810 drives a removable recording medium 811 such as a magnetic disk, an optical disk, a magneto-optical disk, a semiconductor memory or the like.

In the computer configured as described above, as one example the CPU 801 loads a program stored in the storage unit 808 via the input/output interface 805 and the bus 804 into the RAM 803 and executes the program to carry out the series of processes described earlier.

As one example, the program executed by the computer (the CPU 801) may be provided by being recorded on the removable recording medium 811 as a packaged medium or the like. The program can also be provided via a wired or wireless transfer medium, such as a local area network, the Internet, or a digital satellite broadcast.

In the computer, by loading the removable recording medium 811 into the drive 810, the program can be installed into the storage unit 808 via the input/output interface 805. It is also possible to receive the program from a wired or wireless transfer medium using the communication unit 809 and install the program into the storage unit 808. As another alternative, the program can be installed in advance into the ROM 802 or the storage unit 808.

Note that the program executed by the computer may be a program in which processes are carried out in a time series in the order described in this specification or may be a program in which processes are carried out in parallel or at necessary timing, such as when the processes are called.

Note that, in this specification, steps that write the program to be recorded in the recording medium do not necessarily have to be performed in time series in line with the order of the steps, and instead may include processing that is performed in parallel or individually.

For example, the present disclosure can adopt a configuration of cloud computing which processes by allocating and connecting one function by a plurality of apparatuses through a network.

An embodiment of the disclosure is not limited to the embodiments described above, and various changes and modifications may be made without departing from the scope of the disclosure.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Further, an element described as a single device (or processing unit) above may be divided and configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An image processing apparatus including:

a tone curve adjustment unit to perform tone curve adjustment on at least one of a main object region and an other region, which is a region other than the main object region, in an image; and a contrast adjustment unit to perform contrast enhancement on a region where the tone curve adjustment has been performed by the tone curve adjustment unit.

(2)

The image processing apparatus according to (1), wherein the tone curve adjustment unit performs the tone curve adjustment to make the main object region brighter.

(3)

The image processing apparatus according to (2), wherein the tone curve adjustment unit performs the tone curve adjustment to make the main object region brighter after dynamic range adjustment.

(4)

The image processing apparatus according to (2), wherein the tone curve adjustment unit performs the tone curve adjustment to make the main object region brighter according to brightness of the other region.

(5)

The image processing apparatus according to (2), wherein the tone curve adjustment unit performs the tone curve adjustment to make the main object region brighter according to user operation.

(6)

The image processing apparatus according to any of (1) to (5), wherein the tone curve adjustment unit performs the tone curve adjustment to make the other region darker.

(7)

The image processing apparatus according to (6), wherein the tone curve adjustment unit performs the tone curve adjustment to make the other region darker after dynamic range adjustment.

(8)

The image processing apparatus according to (6), wherein the tone curve adjustment unit performs the tone curve adjustment to make the other region darker or brighter according to brightness of the other region.

(9)

The image processing apparatus according to (6), wherein the tone curve adjustment unit performs the tone curve adjustment to make the other region darker or brighter according to user operation.

(10)

The image processing apparatus according to (6), wherein the tone curve adjustment unit performs the tone curve adjustment to make a part other than a bright part darker in the other region.

(11)

The image processing apparatus according to (10), wherein the contrast adjustment unit prohibits the contrast enhancement on the other region when the other region is included in a region where the tone curve adjustment has been performed by the tone curve adjustment unit.

(12)

The image processing apparatus according to any of (1) to (11), wherein the tone curve adjustment unit performs the tone curve adjustment to make the main object region brighter and to make the other region darker.

(13)

The image processing apparatus according to any of (1) to (12), wherein the contrast adjustment unit performs the contrast enhancement in which a contrast enhancement characteristic is changeable for each region according to an average value of local regions in the image.

(14)

The image processing apparatus according to (13), wherein the contrast adjustment unit includes a local level adjustment unit to adjust the average value of local regions in the image, and performs the contrast enhancement in which the contrast enhancement characteristic is changeable for each region according to the average value of local regions in the image adjusted by the local level adjustment unit.

(15)

The image processing apparatus according to (14), wherein the local level adjustment unit adjusts the average value of local regions in the image with a characteristic according to a brightness distribution bias.

(16)

The image processing apparatus according to (14), wherein the local level adjustment unit adjusts the average value of local regions in the image according to user operation.

(17)

The image processing apparatus according to any of (1) to (16), wherein the main object region includes a face region and a region where extension is performed from the face region in a body direction.

(18)

The image processing apparatus according to (17), wherein an amount of the extension becomes smaller as a size of the face region becomes larger.

(19)

An image processing method including:

performing, by an image processing apparatus, tone curve adjustment on at least one of a main object region and an other region, which is a region other than the main object region, in an image; and performing, by the image processing apparatus, contrast enhancement on a region where the tone curve adjustment has been performed.

(20)

A program causing a computer to function as:

a tone curve adjustment unit to perform tone curve adjustment on at least one of a main object region and an other region, which is a region other than the main object region, in an image; and a contrast adjustment unit to perform contrast enhancement on a region where the tone curve adjustment has been performed by the tone curve adjustment unit.

REFERENCE SIGNS LIST

100 image processing apparatus
111 individual-part image processing unit
111-1 main-part image processing unit
111-2 background-part image processing unit
112 image combination unit
121 tone curve adjustment unit
122 adaptive contrast adjustment unit 131 local level detection unit
132 contrast adjustment unit
141 subtracter
142 adder
151 D-range adjustment unit
152 signal distribution unit
161 local level adjustment unit
162 contrast adjustment unit
163 gain adjustment coefficient setting unit
164 gain adjustment unit
200 main object region setting unit

The invention claimed is:
1. An image processing apparatus, comprising:
a central processing unit (CPU) configured to:
generate a first adjusted image based on tone curve adjustment of at least one of a first primary object region or a first secondary region of a subject image, wherein the first secondary region of the subject image, is different from the first primary object region of the subject image; and
generate a second adjusted image based on contrast enhancement of a tone curve adjusted region of the first adjusted image,
wherein the contrast enhancement comprises modification of a first contrast enhancement characteristic of the tone curve adjusted region of the first adjusted image based on a first average value of a plurality of first local regions in the first adjusted image.
2. The image processing apparatus according to claim 1, wherein the CPU is further configured to increase, based on the tone curve adjustment, a first brightness of the first primary object region of the subject image to generate a second primary object region in the first adjusted image, and
wherein the generated second primary object region is brighter than the first primary object region.
3. The image processing apparatus according to claim 2, wherein the CPU is further configured to increase the first brightness of the first primary object region to generate the second primary object region based on dynamic range adjustment.
4. The image processing apparatus according to claim 2, wherein the CPU is further configured to increase the first brightness of the first primary object region to generate the second primary object region based on a second brightness of the first secondary region of the subject image.
5. The image processing apparatus according to claim 2, wherein the CPU is further configured to increase the first brightness of the first primary object region to generate the second primary object region based on a user operation.
6. The image processing apparatus according to claim 1, wherein the CPU is further configured to decrease, based on the tone curve adjustment, a third brightness of the first secondary region of the subject image to generate a second secondary region in the first adjusted image, and
wherein the generated second secondary region is darker than the first secondary region.
7. The image processing apparatus according to claim 6, wherein the CPU is further configured to decrease the third brightness of the first secondary region to generate the second secondary region based on dynamic range adjustment.
8. The image processing apparatus according to claim 6, wherein the CPU is further configured to decrease the third brightness of the first secondary region to generate the second secondary region based on a fourth brightness of the first primary object region.
9. The image processing apparatus according to claim 6, wherein the CPU is further configured to decrease the third brightness of the first secondary region to generate the second secondary region based on a user operation.
10. The image processing apparatus according to claim 6, wherein the CPU is further configured to decrease, based on the tone curve adjustment, a fifth brightness of a part other than a bright part in the first secondary region of the subject image.
11. The image processing apparatus according to claim 1, wherein the CPU is further configured to prohibit the contrast enhancement on the first secondary region based on the first secondary region that is included in the tone curve adjusted region.
12. The image processing apparatus according to claim 1, wherein based on the tone curve adjustment, the CPU is further configured to:
increase a first brightness of the first primary object region of the subject image to generate a second primary object region in the first adjusted image; and
decrease a second brightness of the first secondary region of the subject image to generate a second secondary region in the first adjusted image,
wherein the generated second primary object region is brighter than the first primary object region, and
wherein the generated second secondary region is darker than the first secondary region.
13. The image processing apparatus according to claim 1, wherein the
CPU is further configured to generate a third adjusted image based on an adjustment of the first average value of the plurality of first local regions in the first adjusted image, and
wherein the contrast enhancement further comprises modification of a second contrast enhancement characteristic for each of a plurality of modified regions of the third adjusted image based on a second average value of a plurality of second local regions in the third adjusted image.
14. The image processing apparatus according to claim 1, wherein the CPU is further configured to adjust the first average value of the plurality of first local regions in the first adjusted image with a first characteristic based on a brightness distribution bias.
15. The image processing apparatus according to claim 1, wherein the CPU is further configured to adjust the first average value of the plurality of first local regions in the first adjusted image based on a user operation.
16. The image processing apparatus according to claim 1, wherein the first primary object region includes a face region and an expansion region that is extendable from the face region in a body direction.
17. The image processing apparatus according to claim 16, wherein the expansion region is extendable by an amount that decreases based on an increase in a size of the face region.
18. An image processing method, comprising:
in an image processing apparatus:
generating a first adjusted image based on tone curve adjustment of at least one of a primary object region or a secondary region of a subject image,
wherein the secondary region of the subject image is different from the primary object region of the subject image; and generating a second adjusted image based on contrast enhancement of a tone curve adjusted region of the first adjusted image, wherein the contrast enhancement comprises modifying a contrast enhancement characteristic of the tone curve adjusted region of the first adjusted image based on an average value of a plurality of local regions in the first adjusted image.

19. A non-transitory computer-readable medium having stored thereon, computer-executable instructions for causing a computer to execute operations, the operations comprising:

generating a first adjusted image based on tone curve adjustment of at least one of a primary object region or a secondary region of a subject image, wherein the secondary region of the subject image is different from the primary object region of the subject image; and generating a second adjusted image based on contrast enhancement of a tone curve adjusted region of the first adjusted image, wherein the contrast enhancement comprises modifying a contrast enhancement characteristic of the tone curve adjusted region of the first adjusted image based on an average value of a plurality of local regions in the first adjusted image.

\* \* \* \* \*